US008286998B2

(12) United States Patent
Seike

(10) Patent No.: US 8,286,998 B2
(45) Date of Patent: *Oct. 16, 2012

(54) GENERATING ELECTRICAL ENERGY USING A SEATBELT

(75) Inventor: Aya Seike, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,209

(22) Filed: Apr. 4, 2012

(65) Prior Publication Data

US 2012/0193955 A1  Aug. 2, 2012

Related U.S. Application Data

(63) Continuation of application No. 12/770,008, filed on Apr. 29, 2010, now Pat. No. 8,172,266.

(51) Int. Cl.
*B60R 22/28* (2006.01)

(52) U.S. Cl. ....................................................... 280/805

(58) Field of Classification Search .................. 280/805, 280/806, 807; 297/474, 475, 476, 477
See application file for complete search history.

(56) References Cited

U.S. PATENT DOCUMENTS

| 6,726,249 B2 * | 4/2004 | Yano et al. ..................... 280/805 |
| 7,506,832 B2 * | 3/2009 | Mori ............................. 242/374 |
| 7,611,086 B2 | 11/2009 | Inuzuka et al. |
| 7,717,215 B2 | 5/2010 | Tanaka |
| 2006/0219484 A1 | 10/2006 | Ogura |
| 2010/0283593 A1 | 11/2010 | Miller et al. |

OTHER PUBLICATIONS

Online source: Wikipedia, language Japanese, subject Seatbelt [http://ja.wikipedia.org/wiki/%E3%82%B7%E3%83%BC%E3%-83%88%E3%83%99%E3%83%AB%E3%83%88] Retrieved Apr. 4, 2010.
Online Parts Catalog, Interior: Seat Belts [online: http://opc.mr2oc.com/online_parts_catalog/Interior/seat%20belt.GIF] Retrieved Apr. 4, 2010.
"Hand Cranked Flashlights," accessed at: http://www.handcrankedradio.com/crank_flashlights.html, pp. 1, accessed on Jul. 19, 2012.

* cited by examiner

*Primary Examiner* — Faye M. Fleming
(74) *Attorney, Agent, or Firm* — Maschoff Gilmore & Israelsen

(57) ABSTRACT

Seatbelt systems for generating electrical energy. The seatbelt systems may include a first and second engagement units and an electrical energy generation unit. The first engagement unit may be configured to rotate upon movement of a portion of a seatbelt in contact therewith. The second engagement unit may include at least one portion configured to rotatably engage the first engagement unit and to rotate relative to movement of the first engagement unit in an engaged position. The electrical energy generation unit may be operably coupled to the second engagement unit and configured to generate electrical energy upon rotation of the second engagement unit. Vehicles including the seatbelt systems and methods for fabricating the seatbelt systems are also disclosed.

20 Claims, 4 Drawing Sheets

GENERATING ELECTRICAL ENERGY USING A SEATBELT

CROSS-REFERENCE TO RELATED APPLICATION

This patent application is a continuation of U.S. patent application Ser. No. 12/770,008, filed Apr. 29, 2010, which is incorporated herein by reference.

BACKGROUND

The use of a seatbelt as a safety device for passengers of vehicles is widespread. The seatbelt typically secures the passenger in the vehicle so that the passenger is protected in case the vehicle is involved in an accident. In addition, the seatbelt secures the passenger when the vehicle encounters rough operating conditions that might otherwise cause the passenger to be thrown from his or her seat.

A seatbelt is generally associated with a seat that the passenger sits in while in the vehicle. To operate the seatbelt, the passenger typically pulls on the seatbelt associated with the seat until the seatbelt is snuggly fit across the passenger's body. The seatbelt is then locked into place by a seatbelt lock. When the passenger no longer desires to wear the seatbelt, he or she simply unlocks the seatbelt lock and the seatbelt rewinds to its position prior to being worn by the passenger. Since most passengers wear the seatbelt any time they are in the vehicle when the vehicle is moving, an individual seatbelt may be pulled and released many times as it is worn and removed.

SUMMARY

Technologies described herein generally include seatbelt systems for generating electrical energy, vehicles including the seatbelt systems and methods for fabricating the seatbelt systems.

The seatbelt systems may include a first and second engagement units and an electrical energy generation unit. The first engagement unit may be configured to rotate upon movement of a portion of a seatbelt in contact therewith. The second engagement unit may include at least one portion configured to rotatably engage the first engagement unit and to rotate relative to movement of the first engagement unit in an engaged position. The electrical energy generation unit may be operably coupled to the second engagement unit and configured to generate electrical energy upon rotation of the second engagement unit.

The vehicles configured to generate electrical energy from the use of a seatbelt may include a seat, a seatbelt associated with the seat, a seatbelt rewinding mechanism, first and second engagement units and an electrical energy generation unit. The seatbelt rewinding mechanism may be attached to the seatbelt and configured to release and retract at least a portion of the seatbelt. The first engagement unit may be rotatably engaged with at least one region of the seatbelt so that the first engagement unit rotates upon movement of the seatbelt by the seatbelt rewinding mechanism. The second engagement unit may be configured to rotatably engage the first engagement unit so that, upon engagement, the second engagement unit rotates relative the first engagement unit. The electrical energy generation unit may be configured to generate electrical energy upon rotation of the second engagement unit.

The methods for fabricating a seatbelt system may include positioning a first engagement unit in rotatable engagement with a second engagement unit, the first engagement unit configured to engage a portion of a seatbelt and to rotate upon movement of the seatbelt and operably coupling the second engagement unit to an electrical energy generating mechanism configured to generate electrical energy in response to rotation of the second unit.

DETAILED DESCRIPTION

Figure 1:
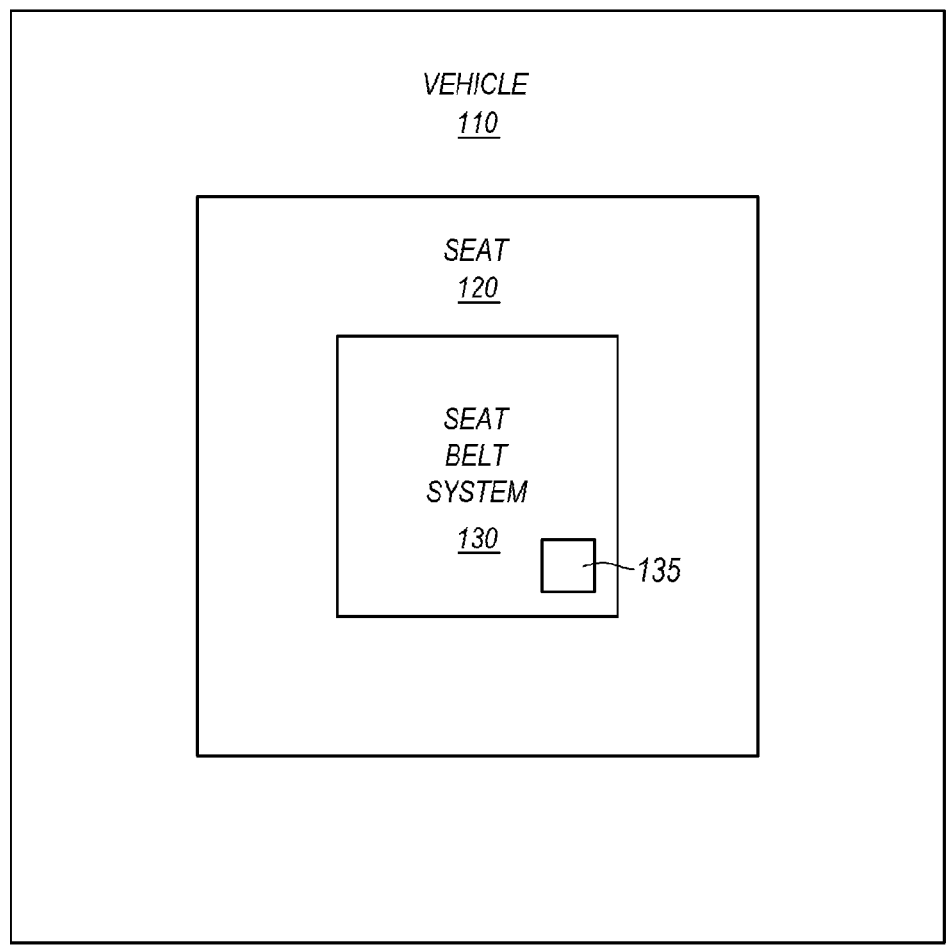
FIG. 1 is a schematic diagram of an illustrative embodiment of a vehicle with an electrical generating seatbelt system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The implementation of seatbelts is widespread in most types of vehicle, especially vehicles designed to carry one or more passengers. Accordingly, seatbelts are used numerous times a day in most vehicles. Each time a seatbelt is pulled or so that it can be worn by a vehicle passenger or released so that is can be removed from the passenger, the seat is moved from a first position to a second position. The movement of the seatbelt generates kinetic energy that may be converted into electrical energy for vehicle use. The methods and systems described herein may be used to generate electrical energy from the movement of a seatbelt, which may then be used to power various systems of the vehicle. For large vehicles with many seatbelts, such as an airplane, the amount of kinetic energy that potentially can be converted may be quite large. However, even an automobile with one or two seatbelts may produce a useable amount of kinetic energy for conversion according to the embodiments described herein.

In one illustrative embodiment, a vehicle may include one or more seats. The term "vehicle" is used herein to describe any motorized or non-motorized vehicle that may carry one or more passenger. For example, a vehicle may be an automobile or car. A vehicle may also be an airplane, a train, a bus, a ship, a boat or some other common carrier that includes seatbelts for passenger restraint.

The term "passenger" is used herein to describe any person, animal or object that occupies the vehicle while the vehicle is in use. For example, a driver is considered a passenger as are all other human occupants of a vehicle in use.

Non-human living occupants such as pets are also passengers of a vehicle in use. In addition, non-human cargo may also be considered a passenger of the vehicle when the cargo occupies a vehicle in use.

The term "seat" is used herein to describe a portion of a vehicle that a passenger uses while the vehicle is in use. For example, a seat may be a common seat that the passenger sits in such as seats in an automobile, car, airplane or bus. A seat may also be a vehicle portion that the passenger leans against while the vehicle is in motion. In addition, when the passenger is non-human cargo, a seat may be the element the non-human cargo occupies.

Each of the seats may include one or more seatbelts that are used to the restrain the vehicle passengers. The term "seatbelt" is used to describe any restraining system or device that restrains a passenger to a vehicle seat. In addition, any portion of the seatbelt may be considered a seatbelt. For example, a lap belt, a shoulder belt, a five-point restraint belt or any portion thereof may all be considered seatbelts, as can restraining devices associated with children's car seats or booster seats. In addition, any restraining device or portion thereof that restrains non-human cargo may be considered a seatbelt.

In the illustrative embodiment, each seatbelt may be associated with a seatbelt system that is able to generate electrical energy when the seatbelt is moved. The seatbelt system may include a rewinding mechanism, an electrical energy generation mechanism, a charging mechanism, and a locking mechanism.

The rewinding mechanism may include part of the seatbelt and may also include a first rotational engagement unit. The seatbelt rewinding mechanism may also include a spring that retracts or rewinds the seatbelt.

The electrical energy generation unit may include a second rotational engagement member and an electrical energy generation unit. The electrical energy generation unit may include generation circuitry that generates the electrical energy. The term "electrical energy" is used herein to describe any form of electricity or electrical current. The first and second rotational engagement units may be gears whose teeth engage.

The locking mechanism may cause the first and second rotational engagement units to engage and disengage one another. For example, when the seatbelt is moved by being pulled so that it may be worn by the passenger, the seatbelt may be engaged with a seatbelt lock. When the seatbelt is engaged with the seatbelt lock, the locking mechanism may cause the first and second rotational engagement units to disengage. When the seatbelt is released from the seatbelt lock so that the seatbelt rewinds or retracts after being worn by the passenger, the locking mechanism may engage the first and second rotational engagement units.

The movement of the seatbelt, either by being pulled or by retracting or rewinding, may cause the first rotational engagement unit to rotate. Since the first rotational engagement unit is typically engaged with the second rotational engagement unit when the seatbelt moves, the rotation of the first rotational engagement unit may cause the second rotational engagement unit to also rotate. The term "rotate" is used herein to describe any movement of a rotational engagement unit, an electrical energy generation unit, or electrical generation circuitry in any direction.

The rotation of the second rotational engagement unit may cause the electrical energy generation unit to generate electrical energy. For example, the electrical energy generation circuitry may generate the electrical energy. The electrical energy generation unit may be a motor that is rotated by the second rotational engagement unit. This rotation and the rotation of the associated electrical energy generation circuitry generate the electrical energy.

The charging mechanism may then charge a battery with the generated electrical energy. For example, the charging mechanism may be a capacitor that converts the generated electrical energy from AC to DC and then charges the battery. The electrical energy that is stored in the battery may be used by the vehicle as needed.

Several illustrative embodiments of respective aspects of present disclosure are given blow by way of example with reference to the accompanying Figures. FIG. 1 is a schematic diagram of an illustrative embodiment of a vehicle 110 with an electrical generating seatbelt system. The illustrative embodiment, by which the vehicle 110 may generate electricity from the use of a seatbelt, will be described in more detail below.

In this embodiment, the vehicle 110 may be any vehicle that includes a seatbelt for restraining one or more passengers. For example, the vehicle 110 may be an automobile or car. The vehicle 110 may also be an airplane, a train, a bus, a ship, a boat or some other common carrier that includes seatbelts for passenger restraint. In still further embodiments, the vehicle 110 may be a roller coaster or other amusement park ride where seatbelts are used. The vehicle 110 may further be a rocket or other space-going vessel with seatbelts. As mentioned, the embodiments disclosed herein contemplate any vehicle that uses seatbelts for passenger restraint.

The vehicle 110 includes a seat 120. The seat 120 may be any seat that allows a passenger of vehicle 110 to use while being restrained by a seatbelt 135. For example, the seat 120 may be a seat that a passenger may sit in while being restrained in a seatbelt such as those commonly found in automobiles, trucks, airplanes and similar vehicles. In other embodiments, the seat 120 may be a seat that allows the passenger to stand or lean against while being restrained in a seatbelt as is found in many amusement park rides. In still further embodiments, the seat 120 may be a cargo hold or other device where non-human cargo may be placed.

A seatbelt system 130 having the seatbelt 135 is associated with the seat 120. The seatbelt system 130 allows seatbelt 135 to be worn by or removed from the passenger of vehicle 110. In addition, as will be explained in more detail to follow, the seatbelt system 130 allows for the generation of electrical energy anytime the seatbelt 135 is moved by either being pulled so that the seatbelt 135 may be worn by the passenger or being released so that the seatbelt 135 may be retracted when the user the seatbelt 135 no longer wears the seatbelt. It will be appreciated that the seatbelt 135 may be worn by or removed from the passenger without direct action by the passenger. For example, in the case of a passenger that is a non-human animal or non-human cargo, a human or an automated system would typically cause the seatbelt to be worn or removed from the passenger. Likewise, in the case of a human passenger that is too young or too infirm to operate the seatbelt 220 by him or herself, another human or the automated system may be used to cause the seatbelt to be worn or removed from the passenger.

Figure 2:
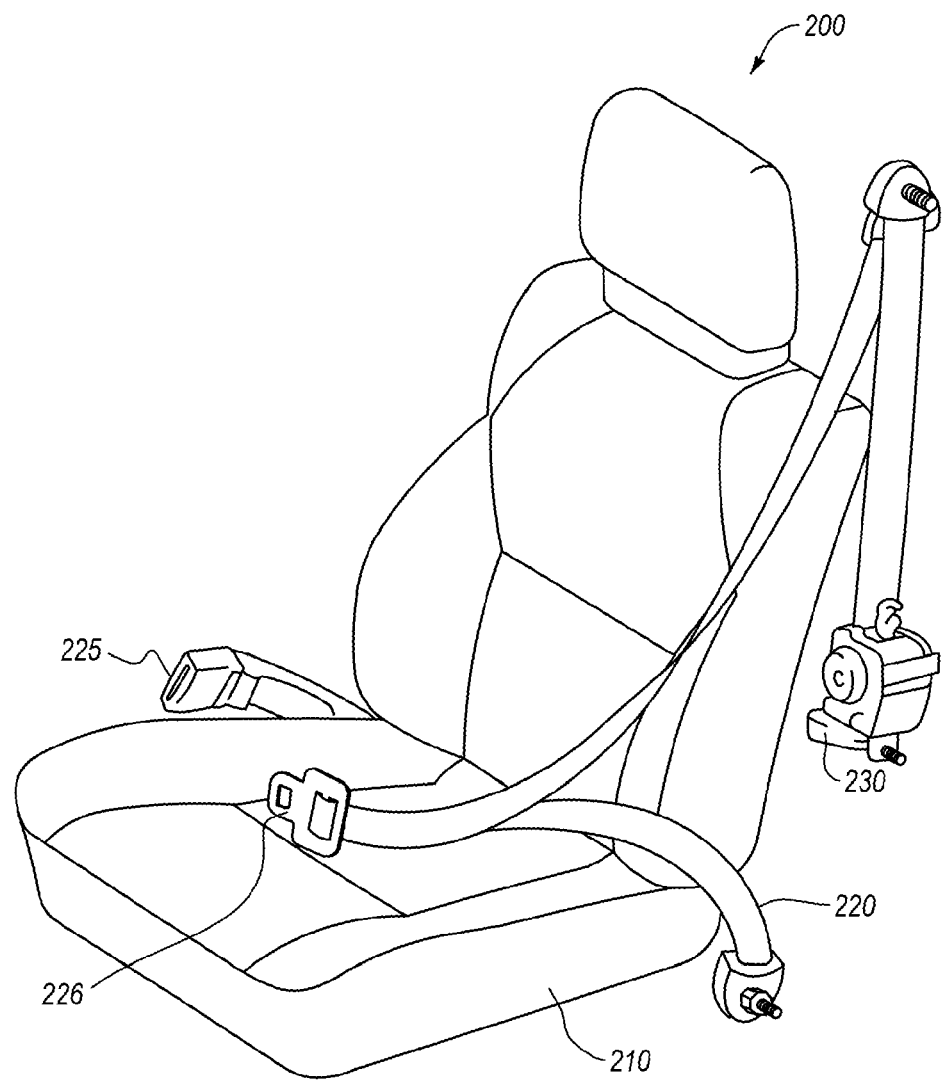
FIG. 2 is a schematic diagram of an illustrative embodiment of a vehicle seat that includes an electrical generating seatbelt system.

FIG. 2 illustrates a schematic diagram of an illustrative embodiment 200 of a seat and associated seatbelt system for generating electrical energy. As shown, FIG. 2 includes a seat 210. In the illustrated embodiment, the seat 210 is an automobile seat that is commonly found in both a front portion of the automobile where a driver sits and a rear portion of the automobile where non-driver passengers sit. As already described herein, the seat 210 may be other types of seats, suitable examples of which are described elsewhere herein.

A seatbelt 220 is associated with the seat 210. In the illustrated embodiment, the seatbelt 220 is designed to go over both the lap of the passenger and the shoulder and torso of the passenger. In other embodiments, the seatbelt 220 may only include the lap belt portion or may only include the shoulder and torso portion. In further embodiments, the seatbelt 220 may be designed to go over both shoulders and to connect in the middle of the passenger's torso as is common in five point restraint seatbelt systems. Of course, it will be appreciated that the seatbelt 220 may be of any reasonable configuration that is designed to secure the passenger into the seat 210.

The seatbelt 220, regardless of its configuration, will typically include a seatbelt lock insert 226 that is designed to engage with a seatbelt lock 225. The seatbelt lock 225 locks the seatbelt into place so that the passenger wearing the seatbelt is properly restrained. When the passenger desires to remove the seatbelt 220, he or she can release the seatbelt lock 225, which will cause the seatbelt lock insert 226 to disengage from the seatbelt lock 225. Although the illustrated embodiment shows the seatbelt lock 225 and seatbelt lock insert 226 in a position that is typical of automobile seatbelts, in other embodiments these elements may be in other positions. For example, in a five point restraint system, the seatbelt lock 225 and seatbelt lock insert 226 may be posited so as to be over the torso of the passenger. Other reasonable positions may also be implemented in other embodiments.

Although the illustrated embodiment shows that the seatbelt 220 is designed to be manually used by the passenger, this need not be the case. In some embodiments, the seatbelt 220 may include an automated system that may cause the seatbelt lock insert 226 to automatically engage the seatbelt lock 225 when a passenger is placed in the seat 210. Likewise, the automated system may cause the seatbelt lock insert 226 to automatically disengage the seatbelt lock 225 when a passenger is removed from the seat 210.

A seatbelt system 230 for generating electricity is associated with the seat 210 and the seatbelt 220. In the illustrative embodiment of FIG. 2, the seatbelt system 230 includes a rewinding mechanism that includes a portion of the seatbelt 220. The rewinding mechanism releases the portion of the seatbelt 220 when the seatbelt is pulled to be placed on the passenger and retracts the portion of the seatbelt 220 when the seatbelt is removed from the passenger.

The rewinding mechanism may also include a first rotational engagement unit. The first rotational engagement unit engages or otherwise is coupled to the portion of the seatbelt 220 that is included in the rewinding mechanism. When the portion of the seatbelt 220 in the rewinding mechanism is moved by being pulled or retracted, the first rotational engagement unit rotates.

In the illustrated embodiment, the seatbelt system 230 may also include an electricity generation mechanism. The electricity generation mechanism may include a second rotational engagement unit that is operably coupled to an electricity generation unit. The second rotational engagement unit may engage with the first rotational unit of the rewinding mechanism so that when the first rotational unit of the rewinding mechanism rotates, the second rotational engagement unit of the electricity generation mechanism may also rotate.

The rotation of the second rotational engagement unit may cause the electricity generation unit to generate electrical energy. For example, the second rotational engagement unit may rotate the electricity generation unit and its internal electrical energy generation circuitry so that the electrical energy is generated.

The seatbelt system 230 may further include a locking mechanism. In the illustrated embodiment, the locking mechanism may cause the first and second rotational engagement units to engage so that the electrical energy may be generated. For example, the locking mechanism may cause the engagement of the rotational engagement units when the seatbelt 220 is not connected or engaged with the seatbelt lock 225. Causing the engagement of the rotational engagement units when the seatbelt is not attached or engaged with the seatbelt lock 225 allows the first and second rotational units to rotate together as previously described when the seatbelt 220 is moved.

In the illustrated embodiment of FIG. 2, the seatbelt system may also include a charging mechanism. The charging mechanism may convert the generated electrical energy into a form or format that can be stored. For example, in the illustrated embodiment the generated electrical energy may be AC electrical energy. The charging mechanism may convert this AC electrical energy to DC electrical energy. The DC electrical energy may then be stored in a battery by the charging mechanism. In other embodiments, there may be no need to convert the electrical energy prior to charging the battery. For example, the electrical energy may be directly generated as DC electrical energy.

The illustrated embodiment of FIG. 2 shows the seatbelt system 230 as being placed next to the seat 210. Such placement allows the rewinding mechanism and the electricity generation mechanism to be in close proximity to the seatbelt 220. In addition, this placement may utilize common rewinding mechanisms in automobiles.

It will be appreciated, however, that the seatbelt system 230 may be placed in other locations relative to the seat 210. For example, in embodiments where the seatbelt 220 is only a lap belt or a five-point harness, the seatbelt system 230 may be located under the seat 210, behind the seat 210, or in another location that is in close proximity to the seatbelt 220. In one embodiment, the seatbelt system 230 may be located in the seatbelt lock 225. Accordingly, the seatbelt system 230 may be located in any position that allows the seatbelt 220 to rotate the first rotational engagement unit of the rewinding mechanism.

Figure 3:
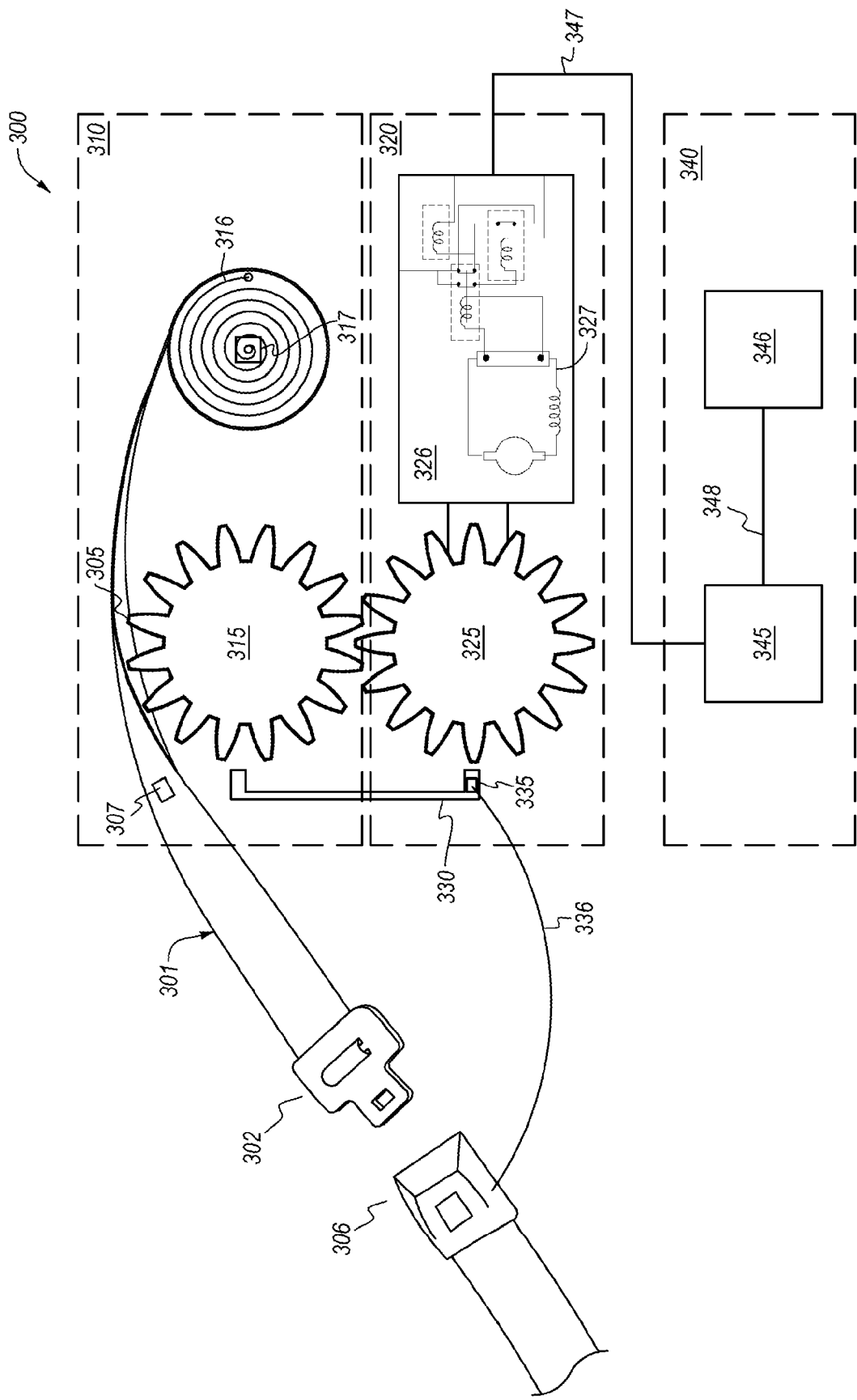
FIG. 3 is a schematic diagram of an illustrative embodiment of a seatbelt system for generating electrical energy.

FIG. 3 is a schematic diagram of an illustrative embodiment of a seatbelt system 300 for generating electrical energy. In one aspect of the illustrated embodiment, the seatbelt system 300 includes a rewinding mechanism 310 including a seatbelt portion 305. The seatbelt portion 305 may be part of a seatbelt 301. In some embodiments, the seatbelt portion 305 is the portion of seatbelt 301 that rewinds or retracts in the rewinding mechanism. In some embodiments, the seatbelt 301 may include a seatbelt lock insert 302.

The rewinding mechanism 310 may include a first rotational engagement unit 315. In one aspect of the embodiment, the first rotational engagement unit 315 may engage, couple, or otherwise touch the seatbelt portion 305 that is part of the rewinding mechanism 310. In one embodiment, the first rotational engagement unit 315 may be a gear with various teeth that engage, couple, or otherwise touch the seatbelt portion 305.

In another aspect, the rewinding mechanism 310 may include a rewind unit 316 that causes the seatbelt portion 305 to rewind. In one embodiment, the rewind unit 316 may include a spring 317 that controls the rewinding of the seatbelt portion 305.

In one aspect, the first rotational engagement unit 315 rotates whenever the seatbelt portion 305 moves. For example, when the seatbelt is pulled so that the seatbelt lock insert 302 may be engaged with a seatbelt lock 306, the seatbelt portion 305 unwinds from the rewind unit 316 and the first rotational engagement unit 315 rotates in a first direction as it is engaged, coupled, or otherwise touching the seatbelt portion 305.

Similarly, when the seatbelt lock insert 302 is released from the seatbelt lock 306, the seatbelt portion 305 retracts and is rewound into the rewind unit 316. For example, the seatbelt portion 305 may be retracted or rewound by the reaction of the spring 317 inside the rewind unit 316. The retracting of the seatbelt portion 305 may cause the first rotational unit 315 to rotate in a second direction.

In another aspect of the illustrated embodiment, the seatbelt system 300 may include an electrical energy generation mechanism 320. In one aspect, the electrical energy generation mechanism may include a second rotational engagement unit 325. In one aspect of the embodiment, the second rotational engagement unit 325 may engage, couple, or otherwise touch the first rotational engagement unit 315. In one embodiment, the second rotational engagement unit 325 may be a gear with various teeth that may engage, couple, or otherwise touch the first rotational engagement unit 315. In some embodiments, the first and second rotational engagement units 315 and 325 may be a matching pair of gears whose teeth are designed to operably couple to one another.

In another aspect, the electrical energy generation mechanism may include an electrical energy generation unit 326 that operably couples to the second rotational engagement generation 325. The electrical energy generation unit 326 may include electrical energy generation circuitry 327 that generates the electrical energy. The electrical generation circuitry may be any circuitry that is capable of generating electrical energy. In one embodiment, the electrical generation unit may be a motor such as an AC motor that generates electrical energy when rotated. In such embodiments, the rotation may cause the electrical energy generation circuitry 327 to generate the electrical energy.

In one aspect of the illustrated embodiment, the seatbelt system 300 includes a locking mechanism 330. The locking mechanism 330 is designed to cause the first and second rotational engagement units 315 and 325 to engage and disengage as needed. For example, in one embodiment, the locking mechanism 330 may cause the first and second rotational engagement units to engage whenever the seatbelt lock insert 302 is not attached or not engaged with the seatbelt lock 306 and to cause the first and second rotational engagement units to disengage whenever the seatbelt lock insert 302 is attached to or engaged with the seatbelt lock 306. In another embodiment, the locking mechanism may cause the first and second rotational engagement units to engage whenever the seatbelt portion 305 moves by being pulled or refracted.

In one embodiment, the locking mechanism 330 may be a moveable bracket or clamp that includes a sensor 335. The sensor 335 may be coupled to a wire 336 that is attached to the seatbelt lock 306. When the seatbelt lock insert 302 disengages with the seatbelt lock 306, the sensor 335, which may be any reasonable sensor, may sense the disengagement of the seatbelt lock insert 302 and the seatbelt lock 306 and in response, may cause the moveable bracket or clamp to move the first and second rotational units so that the rotational engagement units engage, couple, or otherwise touch one another. When the sensor senses that that the seatbelt lock insert 302 and the seatbelt lock 306 are engaged, the sensor may cause the bracket or clamp to move the first and second rotational engagement units so that they no longer engage, couple, or otherwise touch. In some embodiments, the sensor 335 may be a wireless sensor that does not need the wire 336.

In another embodiment, the locking mechanism 330 may be moveable platforms on which are placed the first and second rotational engagement units 315 and 325. One of the moveable platforms may include the sensor 335. Accordingly, when the sensor 335 senses the engagement or disengagement of the seatbelt lock insert 302 and the seatbelt lock 306 as previously described, the sensor 335 may cause the moveable platforms to move so that the first and second rotational engagement units may engage and disengage as described elsewhere herein.

In one embodiment, the locking mechanism 330 and the seatbelt lock 306 may be the same element. In such embodiment, the seatbelt system 300 may be implemented in the seatbelt lock 306 as previously described in relation to FIG. 2 above. Accordingly, the engagement of the seatbelt lock 306 with the seatbelt lock insert 302 may cause the first and second rotational engagement units to disengage and the disengagement of the seatbelt lock 306 and the seatbelt lock insert 302 may cause the first and second rotational engagement units to engage as previously described.

In other embodiments the locking mechanism 330 may be any reasonable system or device, either electrical or mechanical, which causes the first rotational engagement unit 315 to engage and disengage the second rotational engagement unit 325.

In another embodiment, the seatbelt portion 305 may include a sensor 307. The sensor 307 may detect when the seatbelt portion 305 is moved by either being pulled or refracted. The sensor 307 may then communicate this movement, either wirelessly or through a wire, to the sensor 335. The sensor 335 may then cause the locking mechanism 330 to cause the first and second rotational engagement units to engage as previously described. In this embodiment, the locking mechanism 330 functions independent of the seatbelt lock as the movement of the seatbelt causes the locking mechanism to operate as described.

As described previously herein, the second rotational engagement unit 325 engages, couples, or otherwise touches the first rotational engagement unit 315 when caused by the locking mechanism 330. Accordingly, the second rotational engagement unit 325 may rotate whenever it is engaged, coupled, or otherwise touching the first rotational engagement unit 315 and the first rotational engagement unit rotates. For example, when the first rotational engagement unit 315 rotates in the first direction in response to being pulled, the second rotational engagement unit 325 may rotate in a direction that is opposite of the first direction of the first rotational engagement unit 315. Likewise, when the first rotational engagement unit 315 rotates in the second direction in response to being retracted by the rewind unit 316, the second rotational engagement unit 325 may rotate in a direction that is opposite of the second direction of the first rotational engagement unit 325. In other embodiments, however, the second rotational engagement unit 325 may rotate in the same direction as the first rotational engagement unit 315.

The rotation of the second rotational engagement unit 325 may cause the electrical energy generation unit 326 to generate electrical energy. For example, in the embodiments where the electrical energy generation unit is a motor, the rotation of the second rotational engagement unit may cause the motor and the associated electrical energy generation circuitry 327 to rotate. The rotation of the motor and the associated electrical energy generation circuitry 327 may cause the generation of the electrical energy.

In some embodiments where the electrical energy generation unit is not a motor, the rotation of the second rotational engagement unit may still cause the electrical energy generation unit to generate electrical energy. For example, the rotation of the second rotational engagement unit may turn on or otherwise signal that the electrical energy generation circuitry 327 should begin to generate the electrical energy.

In an aspect of the illustrated embodiment, the seatbelt system 300 may include a charging mechanism 340. The charging mechanism 340 may include a conversion unit 345. In one embodiment, the conversion unit 345 is a capacitor that may convert AC electrical energy generated by the electrical energy generation unit 326 into DC electrical energy. In other embodiments, the conversion unit 345 may be semiconductor devices such as rectifiers, thyristors, transistors, or coils that convert AC electrical energy to DC electrical energy at decent energy conversion efficiency.

The charging mechanism 340 may also include a battery 346. The battery 346 may be any reasonable battery and in some embodiments may be the main vehicle battery. In other embodiments, the battery 346 may be a separate battery from the main vehicle battery. The battery 346 may be charged by the conversion unit 345. Accordingly, the electrical energy generated by the electrical energy generation unit 326 may be used to charge the battery 346.

In some embodiments, the charging mechanism 340 may charge the battery 346 without first having to convert the electrical energy from AC to DC. For example, the electrical energy generation unit 326 may generate DC electrical energy that may be directly used to charge battery 346 without the need for conversion.

In the illustrated embodiment, the charging mechanism 340 is shown in close proximity to the other elements of the seatbelt system 300. However, the charging mechanism 340 need not be in close proximity. For example, a wire 347 may be used to provide the electrical energy from the electrical energy generation unit 326. The wire 347 allows the charging mechanism 340 to be placed at a location in the vehicle that is most beneficial. For instance, placing the charging mechanism 340 near the main electrical system of the vehicle may allow the electrical system to use the generated electrical energy.

In the illustrated embodiment, the battery 346 is shown in close proximity to conversion unit 345. However, in other embodiments, the battery 346 may be in locations that are not in close proximity to the conversion unit 345. For example, a wire 348 may allow the battery to be placed in any location in the vehicle that is most beneficial, such as in the engine compartment. In embodiments where the battery 346 is to be placed in the cabin of the vehicle near to where a passenger may sit, a safety box or other protective unit may enclose the battery to protect the passenger from any battery leakage or other battery failure.

In an illustrative embodiment, the electrical energy stored in the battery 346 may be used to power various systems in the vehicle. For example, in one embodiment, the battery 346 may be used to power the movement and adjustment of a vehicle seat such as the seat 210 of FIG. 2. In another embodiment, the battery 346 may be used to power one or more vehicle lights that turn on when a vehicle door is opened or that a passenger turns on. Using the battery 346 to power such local operations as moving the seat 210 or powering vehicle lights may save the main vehicle battery from having to provide energy to such operations. In electrical vehicles that are primarily powered by the main vehicle battery, reducing the load on the main vehicle battery by using the electrical energy stored in the battery 346 for local operations may extend the distance the vehicle may travel. Of course, using the electrical energy stored in the battery 346 for local operations in a gas powered vehicle is still beneficial as it may extend the life of the vehicle battery.

In other embodiments, as mentioned previously herein, the battery 346 may be the main vehicle battery. In such embodiments, the generated electrical energy may be used to help charge the main vehicle battery. In electrical vehicles, the generated energy may help to extend the distance the vehicle may travel by providing additional charge to the main vehicle battery. In addition, the generated electrical energy may help to extend the life of the main vehicle battery in all vehicles.

Figure 4:
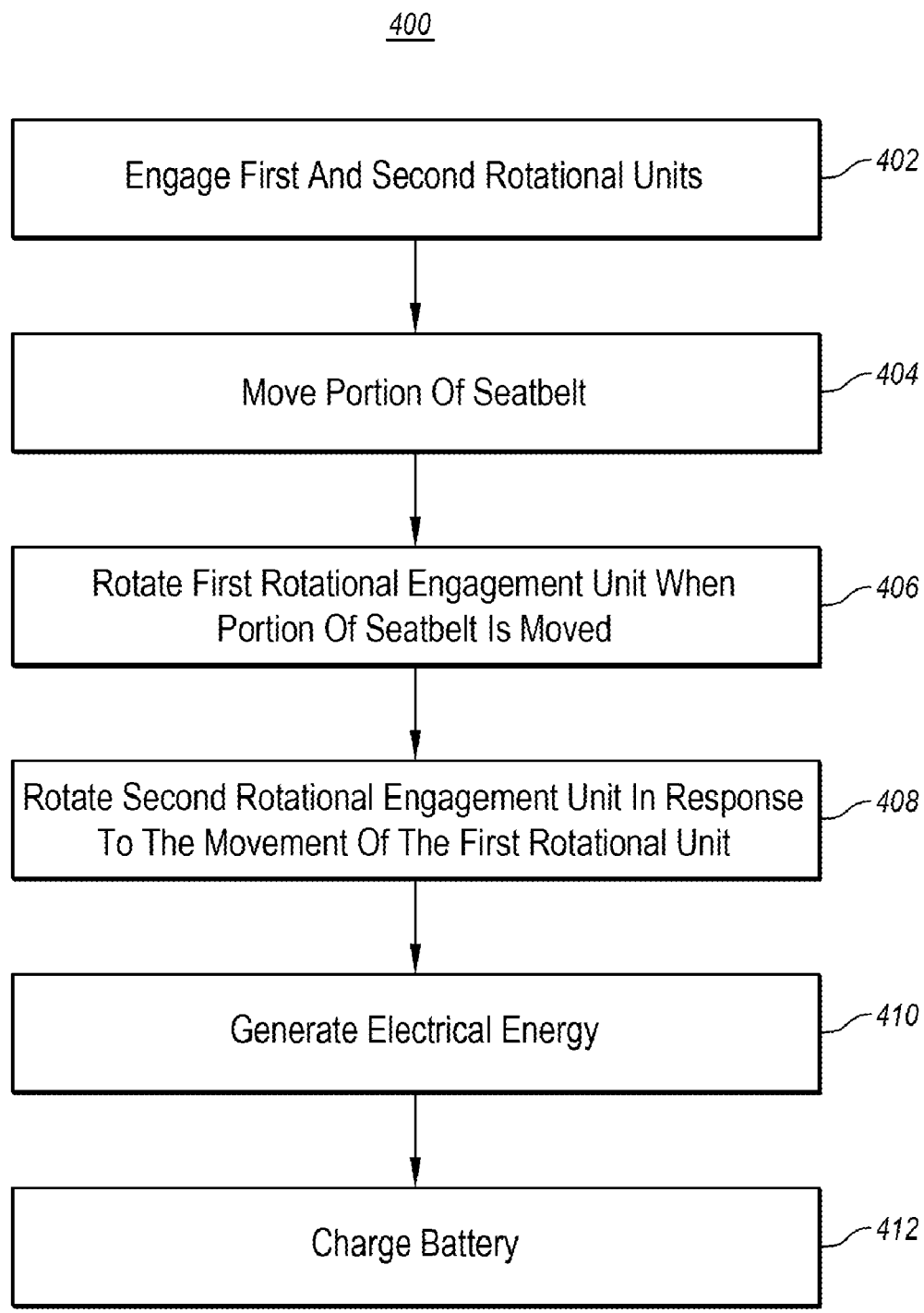
FIG. 4 is a flow diagram of a method for generating electrical energy from a seatbelt system that is designed to generate electrical energy.

FIG. 4 is a flow diagram of a method 400 for generating electrical energy from a seatbelt system that is designed to generate electrical energy. The method 400 includes a block 402 of engaging a first rotational engagement unit that is associated with a seatbelt with a second rotational engagement unit that is associated with an electrical energy generating unit. For example, in one aspect of the block 402, a first rotational engagement unit such as rotational engagement unit 315 may be engaged with a second rotational engagement unit such as second rotational engagement unit 325. In one embodiment, the first rotational unit may engage the second rotational unit when the associated seatbelt is not engaged or attached to a seatbelt lock. In such embodiments, a locking mechanism such as locking mechanism 330 may cause that the first and second rotational engagement units engage one another as previously described herein. In an illustrative embodiment, the first and second rotational engagement units may be gears whose teeth engage one another.

The method 400 also includes a block 404 of moving at least a portion of the seatbelt from a first position to a second position. For example, in one aspect of the block 404, the portion of the seatbelt such as portion 305 may move when the seatbelt is pulled to be engaged or attached to a seatbelt lock such as seatbelt lock 306. In such embodiments, the seatbelt is moved from the first position, which may be the position of the seatbelt portion prior to being pulled, to the second position, which may be the position of the seatbelt portion after the seatbelt is engaged or attached to the seatbelt lock.

In another aspect of block 404, the portion of the seatbelt such as portion 305 may move when the seatbelt is released from the seatbelt lock and is retracted or rewound by a rewinding mechanism such as rewind unit 316. In such embodiments, the seatbelt portion is moved from the first position, which may be the position of the seatbelt portion prior to being released from the seatbelt lock, to the second position, which may be the position of the seatbelt portion after the seatbelt is retracted or rewound by the rewind unit.

The method 400 further includes a block 406 of rotating the first rotational engagement unit in response to the movement of the portion of the seatbelt. The first rotational engagement unit rotates while the seatbelt is moved from the first to the second position. For example, in one aspect of the block 406, the first rotational engagement unit rotates when the portion of the seatbelt moves as the seatbelt is being pulled to engage the seatbelt lock. In another aspect, the first rotational engagement unit moves when the seatbelt portion moves when being rewound or retracted by the rewinding mechanism. As described previously herein, the first rotational engagement unit is associated with the portion of the seatbelt so that the first rotational engagement unit may rotate any time the seatbelt moves. In one illustrative embodiment previously described herein, the first rotational engagement unit 315 moves whenever the seatbelt portion 305 is moved as described previously herein.

The method 400 also includes a block 408 of rotating the second rotational engagement unit in response to the rotation of the first rotational engagement unit. For example, in one aspect of the block 408, the second rotational engagement unit rotates whenever the first rotational engagement unit rotates since the first and second rotational units have been engaged at block 402. In one illustrative embodiment, the second rotational engagement unit rotates in an opposite direction of the first rotational engagement unit. In one illustrative embodiment previously described herein, the second rotational engagement unit 325 rotates when the first rotational engagement unit 315 rotates.

The method 400 further includes a block 410 of generating electric energy in response to rotating the second rotational engagement unit. For example, in one aspect of the block 410, the second rotational engagement unit is attached to an electrical energy generation unit. The rotation of the second rotational engagement unit causes the electrical energy generation unit to generate electrical energy. In one illustrative embodiment, the electrical generation unit is a motor, such as an AC motor, that generates the electrical energy by rotating in response to the rotation of the attached second rotational engagement unit. In some embodiments, the motor may include electrical generation circuitry that rotates to generate the electrical energy. In one illustrative embodiment, the electrical energy generation unit 326 of FIG. 3 may generate electrical energy in response to the rotation of the second rotational engagement unit 325.

The method 400 may further include a block 412 of charging a battery with the generated electrical energy. For example, in one aspect of the block 412, a conversion unit may convert the generated electrical energy into a form that charges the battery. In one illustrative embodiment, the conversion unit converts AC electrical energy into DC electrical energy, which may then be used to charge the battery. In another aspect of the block 412, the battery may be charged directly with the electrical energy generated by the electrical energy generation unit without having the form of the electrical energy changed or converted. In one illustrative embodiment, a charging mechanism 340 may charge the battery 346.

For this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual unit or subgroup of units of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least" and the like include the number recited and refer to ranges which can be subsequently broken down into subranges as discussed above. Finally, as will be understood by one skilled in the art, a range includes each individual unit.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A seatbelt system for generating electrical energy, comprising:
   a first engagement unit configured to rotate upon movement of a portion of a seatbelt in contact therewith;
   a second engagement unit having at least one portion configured to rotatably engage the first engagement unit and to rotate relative to movement of the first engagement unit in an engaged position; and
   an electrical energy generation unit operably coupled to the second engagement unit and configured to generate electrical energy upon rotation of the second engagement unit.

2. The seatbelt system of claim 1, further comprising a charging mechanism configured to charge a battery with the electrical energy generated by the electrical energy generation unit.

3. The seatbelt system of claim 1, further comprising a locking mechanism configured to cause the first and second engagement units to engage so that the first engagement unit may rotate the second engagement unit.

4. The seatbelt system of claim 3, further comprising a sensor configured to sense engagement of a lock insert at one end of the seatbelt with a lock and to move the locking mechanism so that the first and second engagement units disengage.

5. The seatbelt system of claim 1, wherein each of the first and second engagement units comprise a gear having a plurality of teeth, the plurality of teeth on the gear of the first engagement unit configured to engage the plurality of teeth on the gear of the second engagement unit.

6. The seatbelt system of claim 1, wherein the electrical energy generation unit comprises a motor having electrical energy generation circuitry that rotates in response to rotation of the second engagement unit to generate the electrical energy.

7. The seatbelt system of claim 1, further comprising a rewinding mechanism disposed adjacent the first engagement unit and configured to unwind the portion of the seatbelt when the seatbelt is pulled and to wind the portion of the seatbelt when the seatbelt is released.

8. A vehicle configured to generate electrical energy from the use of a seatbelt, comprising:
   a seat disposed within the vehicle;
   a seatbelt associated with the seat;
   a seatbelt rewinding mechanism attached to the seatbelt and configured to release and retract at least a portion of the seatbelt;
   a first engagement unit rotatably engaged with at least one region of the seatbelt so that the first engagement unit rotates upon movement of the seatbelt by the seatbelt rewinding mechanism;
   a second engagement unit configured to rotatably engage the first engagement unit so that, upon engagement, the second engagement unit rotates relative the first engagement unit; and
   an electrical energy generation unit configured to generate electrical energy upon rotation of the second engagement unit.

9. The vehicle of claim 8, further comprising a charging mechanism configured to convert the electrical energy into a form suitable for charging a battery.

10. The vehicle of claim 9, wherein the battery is operably coupled to an electrical system of the vehicle.

11. The vehicle of claim 8, wherein the seatbelt rewinding mechanism further comprises a spring configured to retract the seatbelt when the seatbelt is released from a seatbelt lock and configured to release the seatbelt when the seatbelt is attached to the seatbelt lock.

12. The vehicle of claim 11, further comprising a locking mechanism configured to cause the first and second rotational engagement units to engage, the locking unit causing the engagement when the seatbelt is not attached to the seatbelt lock.

13. The vehicle of claim 12, wherein the locking mechanism comprises a bracket or clamp positioned adjacent the first and second engagement units.

14. The vehicle of claim 8, wherein the first and second engagement units each comprise a plurality of teeth configured to engage one another.

15. A method for fabricating a seatbelt system, comprising:
   positioning a first engagement unit in rotatable engagement with a second engagement unit, the first engagement unit configured to engage a portion of a seatbelt and to rotate upon movement of the seatbelt; and
   operably coupling the second engagement unit to an electrical energy generating mechanism configured to generate electrical energy in response to rotation of the second unit.

16. The method of claim 15, further comprising disposing a moveable locking mechanism adjacent at least one of the first and second engagement unit, the moveable locking mechanism configured to disengage and engage the first and second engagement units.

17. The method of claim 15, further comprising positioning a seatbelt rewinding mechanism adjacent the first engagement unit, the seatbelt rewinding unit configured to retract or release the seatbelt.

18. The method of claim 15, wherein positioning a first engagement unit in rotatable engagement with a second engagement unit comprises engaging teeth on a circumferential edge of the first engagement unit with teeth on a circumferential edge of the second engagement unit.

19. The method of claim 15, wherein operably coupling the second engagement unit to an electrical energy generating mechanism comprises operably coupling the second engagement unit to an AC motor.

20. The method of claim 15, further comprising operably coupling the electrical energy generating mechanism to a charging mechanism configured to store the electrical energy in a battery.

* * * * *

UNITED STATES PATENT AND TRADEMARK OFFICE
CERTIFICATE OF CORRECTION

PATENT NO. : 8,286,998 B2
APPLICATION NO. : 13/439209
DATED : October 16, 2012
INVENTOR(S) : Seike Page 1 of 1

It is certified that error appears in the above-identified patent and that said Letters Patent is hereby corrected as shown below:

In Column 7, Line 51, delete "refracted." and insert -- retracted. --, therefor.

In Column 8, Line 29, delete "refracted." and insert -- retracted. --, therefor.

Signed and Sealed this
Twenty-ninth Day of January, 2013

David J. Kappos
*Director of the United States Patent and Trademark Office*